J. LEDWINKA.
REMOVABLE CUSHION FOR VEHICLES.
APPLICATION FILED JAN. 22, 1916.
1,321,458.
Patented Nov. 11, 1919.
2 SHEETS—SHEET 1.
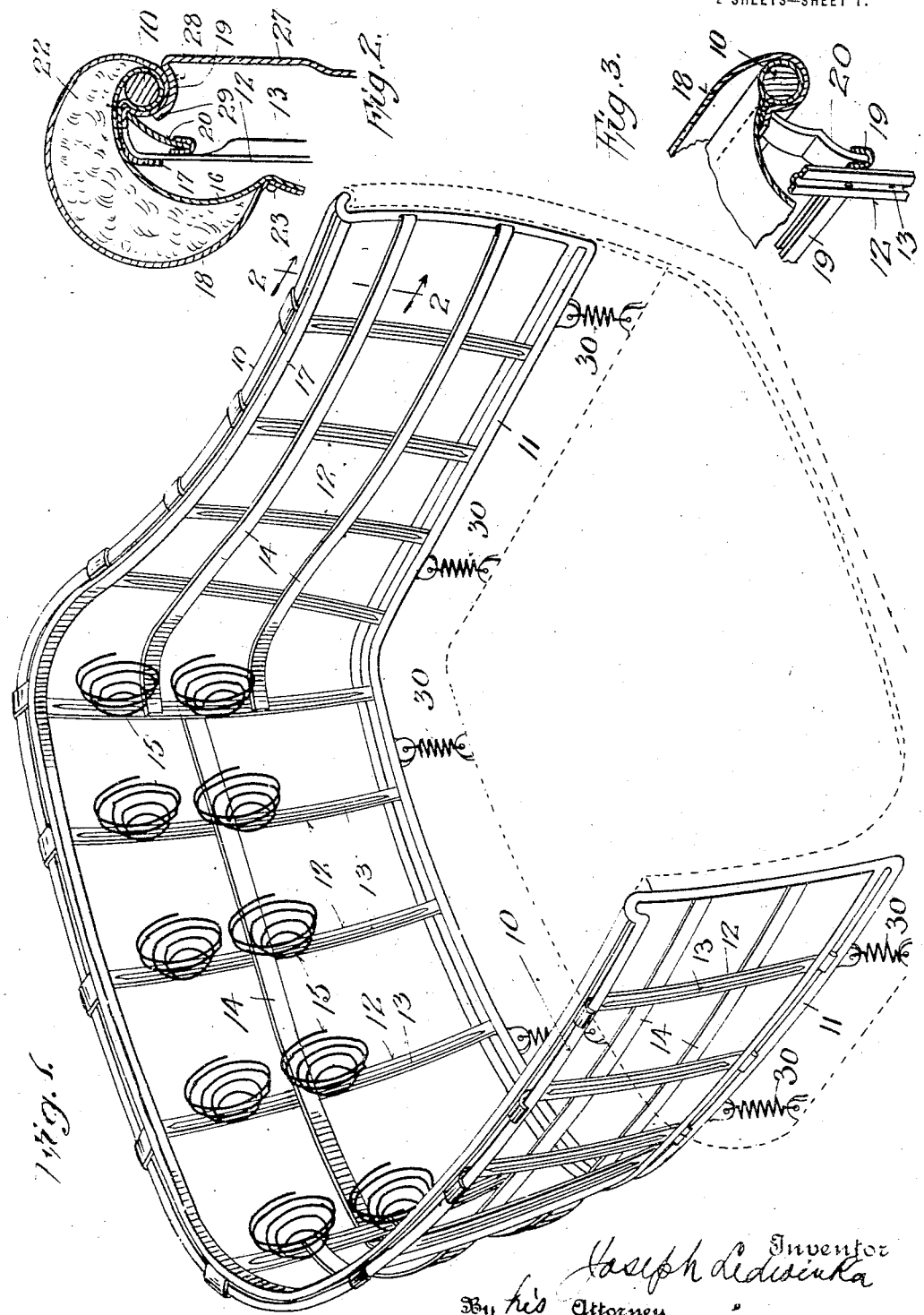

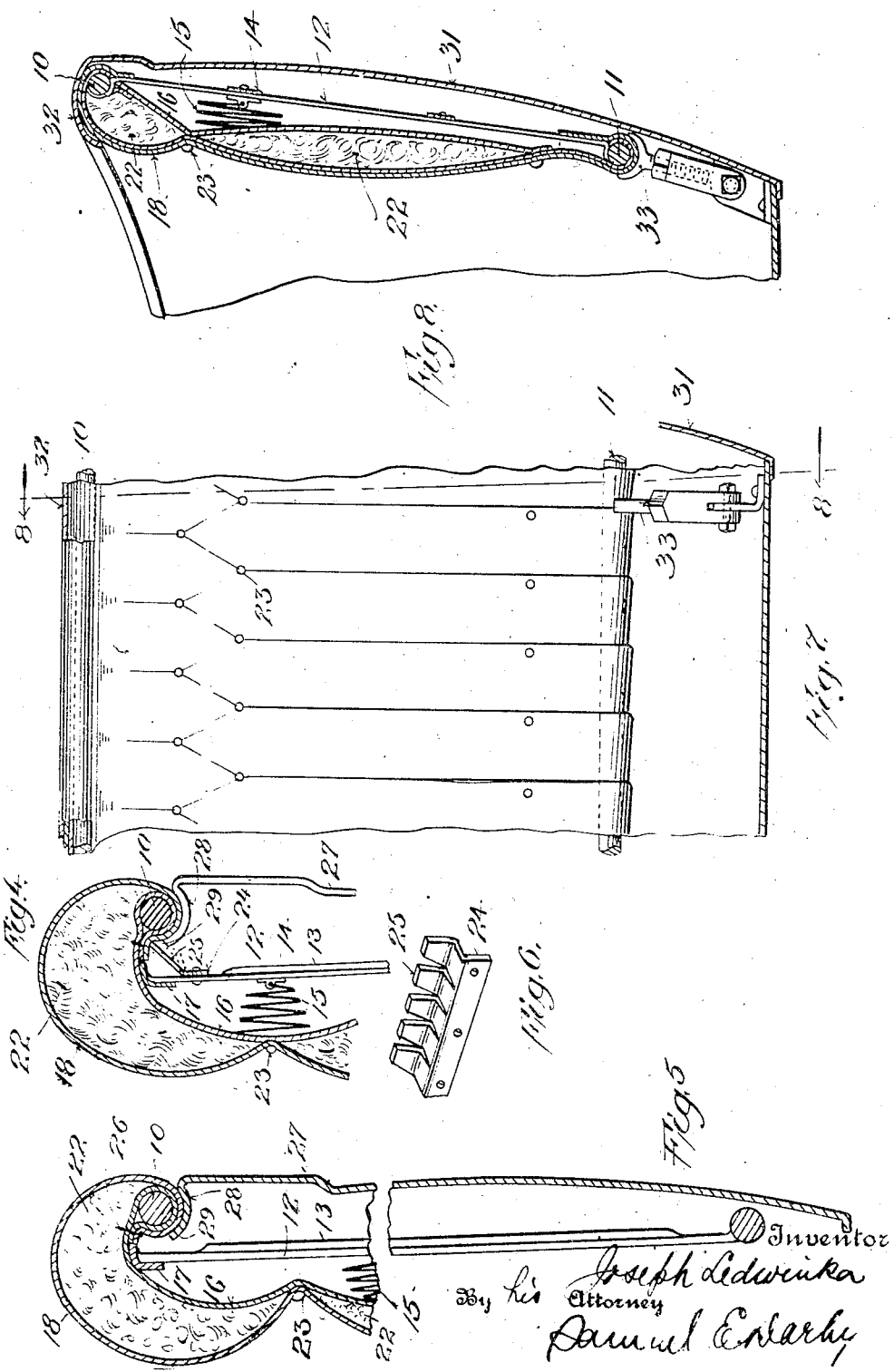

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, A CORPORATION OF PENNSYLVANIA.

REMOVABLE CUSHION FOR VEHICLES.

1,321,458.  Specification of Letters Patent.  Patented Nov. 11, 1919.

Application filed January 22, 1916. Serial No. 73,628.

*To all whom it may concern:*

Be it known that I, JOSEPH LEDWINKA, a citizen of the United States, residing at Philadelphia, county of Philadelphia, State of Pennsylvania, have made a certain new and useful Invention in Removable Cushions for Vehicles, of which the following is a specification.

This invention relates to removable cushions for vehicles and other purposes.

The object of the invention is to provide a cushion or upholstery structure for vehicles and other purposes which is simple, inexpensive to manufacture, and efficient in use.

A further object is to provide a structure of the nature referred to which as a unit is readily and easily removable and replaceable.

A further object is to provide a cushion structure the frame of which is made up of metal parts and wherein the provision of special constructions for securing the upholstery to a vehicle or other body is avoided.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the drawings:—

Figure 1 is a view in perspective of a cushion frame embodying my invention, shaped to the required form for a side and back cushion for an automobile seat, the upholstery being omitted.

Fig. 2 is a broken view in vertical section on the line 2, 2, Fig. 1, looking in the direction of the arrows and showing the cushion frame and upholstery applied thereto, and said frame applied to a vehicle body in accordance with my invention.

Fig. 3 is a similar view in perspective showing a portion of the structure of Fig. 2.

Figs. 4 and 5, are views similar to Fig. 2 showing modified arrangements for securing the leather or other upholstery member to the cushion frame.

Fig. 6 is a detached broken detail view in perspective of a form of retaining clip for securing the upholstery leather member to the cushion frame in the arrangement shown in Fig. 4.

Fig. 7 is a broken view in front elevation, parts of the vehicle body being in vertical transverse section, showing a modified arrangement for detachably securing a cushion to a vehicle body, and embodying the broad principles of my invention.

Fig. 8 is a vertical section on the line 8, 8, Fig. 6, looking in the direction of the arrows.

The same part is designated by the same reference sign wherever it occurs throughout the several views.

In the manufacture of automobile and other vehicles, employing side and back cushions for the seats it is desirable to provide a cushion structure which is readily, easily and conveniently detachable and removable for the purpose of cleaning or replacing the same. It is also desirable to provide a cushion structure which is strong and durable but which at the same time affords the desired cushion-action. As heretofore most generally constructed, particularly in the case of automobile body upholstery, it has been necessary to make special provision of means to secure the upholstery to the vehicle. Moreover, the common practice necessitates building the upholstery into the automobile body at the same time the latter is being constructed. This very greatly adds to the inconvenience as well as the cost of manufacture of the body.

It is among the special purposes of my present invention to provide a structure of side and back cushion for the seats of automobiles and other vehicles, and for other purposes, the frame of which is made of metal stampings and thereby rendered light but strong and durable, and which is readily, easily and conveniently attachable to and detachable from the frame of the vehicle body, which is made up as a unit and therefore can be made up and carried in stock and applied to the vehicle body after the latter has been completed and painted and enameled, and whereby the owner of the automobile or vehicle may replace the upholstery of his machine after the same has become dingy, soiled, or injured in use by fresh new upholstery, or upholstery of a different shade or color, and at comparatively small cost.

In carrying out my invention, in one form of embodiment thereof, I provide a cushion frame composed of the upper and lower metal rods 10, 11, which are connected together by vertical metal bars 12, which, if desired, may be stiffened and strengthened by longitudinal ribs 13, pressed therein. The vertical bars 12 are also connected together by means of the cross straps 14, the whole constituting a flexible metallic frame easily bent longitudinally into the proper shape to conform to the contour of the sides and back of a seat of the automobile or other vehicle body, as clearly shown in Fig. 1. Attached to this frame are the cushion springs 15, over which frame and springs the upholstery or trim is applied. This upholstery may be applied to the frame in any suitable or convenient manner. A simple and efficient arrangement is shown wherein a backing 16, of canvas or other suitable material (and which I will hereinafter call canvas, intending to include thereby any material suitable for the purpose) is looped at its ends around the upper and lower rods 10, 11, respectively of the frame, and then each canvas end is stitched or otherwise secured to the body of the canvas, the canvas body, intermediate its ends, being stretched over the cushion springs 15. If desired and in order to afford a fair lead for the canvas downwardly from the upper frame bar, and to prevent the canvas when stretched, from being drawn into the angle of the frame, I provide the frame with a metal angle piece 17, along the inner portion of the upper edge thereof, and having a curved upper surface, as shown in Fig. 2, and I lead the canvas over the curved upper surface of this angle piece. Also secured at its ends to the rods 10, 11, is the outer member 18 of the upholstery. This member may be leather or any other suitable or desired flexible material, and for the purposes of my invention I will call this member leather intending to include thereby any material suitable for the purpose. As above mentioned, this leather is secured at its ends over the frame rods 10, 11, and is stretched between said rods. The ends of the leather may be secured to or around the rods 10, 11, in many different ways. In Figs. 2 and 3, I have shown a simple inexpensive and efficient arrangement for the purpose wherein a channel member 19 is applied and secured to the vertical frame bars 12, near their upper ends, in such manner as to connect the same together. At suitable intervals apart the angle strips 20 are stepped at their lower ends in the channel member 19, and their upper ends are pressed into the angle between the frame rod 10 and the canvas 16. Now by passing the end of the leather 18 over and around the rod 10, so as to form a loop, and outside the portion of the canvas which is also looped around said rod, and causing the upper ends of the clips 20 to engage against the looped portion of the leather near its end and then hammering the clips from the angle shape thereof shown in Fig. 3, into more or less straight or curved shape as shown in full lines in Fig. 2, the upper ends of the clips are driven tightly into the crotch between the frame rod 10, and the canvas, thereby not only tightly gripping and clamping the end of the leather around the frame rod, but also drawing or stretching the leather tight between its ends, and hence taking out any wrinkles or creases that may be therein. The lower end of the leather is secured in the same manner to the lower frame rod 11.

The filler material 22 is packed into the space between the leather and canvas, and, if desired, and in order to secure a tufted appearance of the finished upholstery, the canvas and leather may be fastened together at desirable points intermediate their ends as indicated at 23.

In Fig. 4 I have shown a slightly modified arrangement for gripping and clamping the end of the leather. In this arrangement a Z-shaped metal strip 24, see Fig. 6, is welded or otherwise secured to the frame bars 12, and said strip is formed with separated tongues 25 at one edge thereof. These tongues are extended into the crotch of the frame bar 10 and canvas 16, to engage against the end portion of the leather which is looped around the rod 10, as indicated in dotted lines. The strip 24 is then hammered into straightened condition, as indicated in full lines, thereby securing the results above explained with reference to the clips 20. In some respects I prefer to use the clips 20 as thereby I am enabled to employ small short pieces of otherwise scrap material.

In Fig. 5 still another method of securing the end of the leather around the frame rod 10 is illustrated. In this arrangement after the end of the leather is looped around the frame rod it is stitched to the canvas as indicated at 26. While I have shown this arrangement as contemplated and included within the broad scope of my invention, I prefer, in practice, to employ one of the other methods above described. The lower end of the leather may be secured in similar manner to that above described.

By the structure above described I provide a flexible, all metal cushion frame with upholstery applied thereto, which may be constructed as a unit and independently of the vehicle body.

The cushion frame and upholstery structure above described may be applied in various ways to the vehicle body. In Figs. 2, 4, and 5, I have shown the upper edge of the vehicle body shell 27, as formed with an inwardly turned portion 28, having an upturned edge 29, thereby forming a shouldered seat. In order to apply the cushion frame thereto, the upper frame bar 10 of the cushion structure, which is laterally offset outwardly from the body of the frame is engaged over the upturned edge 29 and seated in the seat of the flange 28, which is formed by said upturned edge. The lower edge of the cushion frame is then detachably secured by springs 30, to the bottom or floor plate of the vehicle.

By this arrangement the cushion frame is held in tension engaged over the upper edge of the vehicle body shell and pulled downwardly by the tension of springs 30.

In order to detach and remove the cushion frame it is only necessary to detach the springs 30, and lift the cushion frame out, reversing this process when the cushion frame is to be replaced in position.

This structure affords an upholstered cushion for the upper edge of the vehicle body, as well as for the seat sides and back, and it attains the benefits and advantages above set forth.

In Figs. 7 and 8 I have shown another arrangement for applying the cushion frame to a vehicle body wherein the vehicle body shell 31, is provided with an inverted inturned channel portion 32 at its upper edge, and the upper edge of the cushion frame is seated within this inverted channel, and said frame is supported at its lower edge by vertically adjustable forks 33, pivotally connected to the floor plate of the vehicle body.

In this arrangement the cushion frame is held in compression and in order to detach and remove the cushion the fork seats 33 are adjusted downwardly to free the lower edge of the cushion frame and then the upper edge of said frame is drawn downwardly out of the channel 32. This operation is reversed in replacing the cushion frame. This form of my invention leaves the upper edge of the automobile body without any cushion, and for that reason in practice I prefer the form shown in Figs. 2, 4, and 5, wherein there are no exposed metal parts of the vehicle frame or body to cause discomfort to the persons occupying the seat.

While I have shown and described my invention as applied to an automobile body I do not wish in the broadest scope of my invention as defined in the claims to be limited or restricted to such use as the principles thereof are equally well applicable to the construction of the upholstery and cushions for chairs, sofas, settees and the like.

Having now set forth the objects and nature of my invention, and various structures embodying the principles thereof, what I claim as new and useful, and of my own invention, and desire to secure by Letters Patent, is,—

1. The combination with a vehicle body having a seat back and side portions, of a flexible metallic cushion frame unit for said seat back and side portions, said unit including upper and lower rods extending longitudinally of said unit and throughout the extent of both seat sides and back portions of the vehicle body and bent to conform to the contour thereof, vertically extending bars connecting said rods, a canvas sheet having its upper and lower edges respectively looped around said rods, a leather or upholstery sheet also having its upper and lower edges respectively looped around said rods, a filler material interposed between said canvas and upholstery sheets, and means to detachably and removably secure said frame unit under tension to the seat back and side portions of the vehicle body.

2. The combination with a vehicle body having a seat back and side portions, of a flexible metallic cushion frame unit for said seat back and side portions, said unit including upper and lower rods extending longitudinally of said unit and throughout the extent of both seat sides and back portions of the vehicle body and bent to conform to the contour thereof, vertically extending bars connecting said rods, a canvas sheet having its upper and lower edges respectively looped around said rods, a leather or upholstery sheet also having its upper and lower edges respectively looped around said rods, a filler material interposed between said canvas and upholstery sheets, springs interposed between said canvas and the frame unit, and means to detachably and removably secure said frame unit under tension to the seat back and side portions of the vehicle body.

3. The combination with a vehicle body having a seat back and side portions, of a flexible metallic cushion frame unit for said seat back and side portions, said unit including upper and lower rods extending longitudinally of said unit and bent to conform to the contour of said seat back and side portions, vertically extending bars connecting said rods, a canvas sheet having its upper and lower edges respectively looped around said rods, a leather or upholstery sheet also having its upper and lower edges respectively looped around said rods, a filler material interposed between said canvas and upholstery sheets, a metal strip carried by one of the bars of the frame unit and engaging the looped edges of the canvas and leather sheets to grip and hold the same in their looped arrangement around said rods, and means to detachably and removably secure said frame unit to the seat back and side portions of the vehicle body.

4. The combination with a vehicle body having a seat back and side portions formed with a longitudinally extending channel seat at its upper edge, of a flexible metallic frame longitudinally bent to conform to the interior contour of said seat back and side portions and forming a detachable upholstery or cushion frame unit, said unit having its upper longitudinal edge constructed to be removably seated in said channel seat, and means to yieldingly maintain under tension the upper edge of said cushion frame seated in said channel seat.

5. The combination with a vehicle body having a seat back and side portions formed with a longitudinally extending channel seat at its upper edge, of a flexible metallic frame longitudinally bent to conform to the interior contour of said seat back and side portions and forming a detachable upholstery or cushion frame unit, said unit having its upper longitudinal edge constructed to be removably seated in said channel seat, a cushion applied to said frame unit, and means to impose a yielding tension upon said unit to maintain the upper edge thereof seated in said channel seat.

6. The combination with a vehicle body having a seat back and side portions formed with a longitudinally extending channel seat at its upper edge, of a flexible metallic frame longitudinally bent to conform to the interior contour of said seat back and side portions and forming an upholstery or cushion frame unit, said unit having its upper longitudinal edge portion constructed to fit and be seated in said channel seat, and means connected to the lower edge of said cushion frame unit to yieldingly retain the upper edge thereof seated under tension in said channel seat.

7. The combination with a vehicle body having a seat back and side portions formed with a longitudinally extending channel seat at its upper edge, of a flexible metallic frame longitudinally bent to conform to the interior contour of said seat back and side portions and forming an upholstery or cushion frame unit, said unit having its upper longitudinal edge portion constructed to fit and be seated in said channel seat, and yielding means connected to the lower edge of said cushion frame unit to retain the upper edge of said unit seated in said channel seat, said means operating to impart a vertical tension or strain upon said frame unit.

8. The combination with a vehicle body having a longitudinally extending seat formed at its upper edge, of an upholstery or cushion frame unit longitudinally bent to conform to the interior shape of the vehicle body, and having a laterally offset longitudinally extending frame rod at its upper edge to engage over the upper edge of the frame body and to be received in said seat, and means to detachably retain said frame rod yieldingly seated in said seat.

9. The combination with a vehicle body having a longitudinally extending seat formed at its upper edge, of an upholstery or cushion frame unit longitudinally bent to conform to the interior shape or contour of the vehicle body and having its upper longitudinally extending edge portion laterally offset to be detachably engaged in said seat, and springs connected to the lower edge of said cushion frame and exerting a vertically downward tension or strain thereon to retain said cushion frame seated in said seat.

10. The combination with a vehicle body having a longitudinally extending shouldered seat at its upper edge, of a cushion frame unit having its upper longitudinally extending edge laterally offset and seated in said shouldered seat, and springs detachably connecting the lower edge of said frame to the vehicle body and operating to impose a vertically downward tension or strain thereon to retain its upper edge in engagement over said shouldered seat.

In testimony whereof I have hereunto set my hand in the presence of the subscribing witnesses, on this 17th day of January, A. D. 1916.

JOSEPH LEDWINKA.

Witnesses:
 A. H. BUXBAUM,
 L. I. HEINTZ.